United States Patent
Sekiguchi (10) Patent No.: US 8,606,479 B2
(45) Date of Patent: Dec. 10, 2013

(54) VEHICLE DRIVE ASSIST SYSTEM

(75) Inventor: Hiroyuki Sekiguchi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 645 days.

(21) Appl. No.: 12/408,189

(22) Filed: Mar. 20, 2009

(65) Prior Publication Data

US 2009/0248270 A1  Oct. 1, 2009

(30) Foreign Application Priority Data

Mar. 25, 2008 (JP) .................................. 2008-078781

(51) Int. Cl.
*G06F 17/00* (2006.01)

(52) U.S. Cl.
USPC .............................................. 701/96; 340/903

(58) Field of Classification Search
USPC ............................. 701/96, 301; 340/436, 903
See application file for complete search history.

(56) References Cited

U.S. PATENT DOCUMENTS

| 6,044,321 A * | 3/2000 | Nakamura et al. ............. 701/96 |
| 2003/0195704 A1 | 10/2003 | Sekiguchi |
| 2006/0155469 A1 * | 7/2006 | Kawasaki ..................... 701/301 |

FOREIGN PATENT DOCUMENTS

JP    2003-308598    10/2003

* cited by examiner

*Primary Examiner* — Tony Winner
*Assistant Examiner* — Jacob Knutson
(74) *Attorney, Agent, or Firm* — Smith, Gambrell and Russell, LLP (57) ABSTRACT

When a preceding vehicle moves away during follow-up running control, it is determined whether or not a forward obstacle is recognized. When a forward obstacle is recognized, it is determined whether or not the forward obstacle satisfies any of obstacle specifying conditions corresponding to a plurality of preset types. A basic threshold value set corresponding to the satisfied type is corrected by three correction values so as to set first to third estimated-collision-time determining values. The estimated-collision-time determining values are compared with an estimated collision time of a subject vehicle with respect to the forward obstacle, and acceleration control on the subject vehicle is limited stepwise in accordance with the comparison values.

20 Claims, 10 Drawing Sheets

VEHICLE DRIVE ASSIST SYSTEM

CROSS REFERENCE TO RELATED APPLICATIONS

The disclosure of Japanese Patent Application No. 2008-078781 filed on Mar. 25, 2008 including the specification, drawings and abstract is incorporated herein by reference in its entirety.

BACKGROUND OF THE INVENTION

1. Field of the Invention

The present invention relates to a vehicle drive assist system that controls acceleration and deceleration when following a preceding vehicle.

2. Description of the Related Art

In recent years, various proposals have been made for vehicle drive assist systems in which an outside environment in front of a subject vehicle is recognized by a front-environment recognition device such as a millimeter-wave radar, an infrared laser radar, a stereo camera, or a monocular camera, and in which running of the subject vehicle is controlled on the basis of the recognized outside environment.

One of these vehicle drive assist systems is an inter-vehicle distance control (ACC; Adaptive Cruse Control) system. The ACC system performs constant-speed running control or performs follow-up running control so that a subject vehicle follows a preceding vehicle, in accordance with the result of recognition of the preceding vehicle.

The ACC system determines, according to information from the front-environment recognition device, whether or not a preceding vehicle is present in a traveling region of a subject-vehicle traveling path. When a preceding vehicle is detected, the ACC system performs follow-up running control so that the subject vehicle follows the preceding vehicle. In contrast, when a preceding vehicle is not detected, the ACC system performs constant-speed running control so that the subject vehicle travels at a set vehicle speed set by the driver. For example, the ACC system is disclosed in Japanese Unexamined Patent Application Publication No. 2003-308598 (Patent Document 1).

The ACC system performs acceleration and deceleration control and brake control in accordance with the inter-vehicle distance between the preceding vehicle recognized by the front-environment recognition device and the subject vehicle so that the inter-vehicle distance converges to a target inter-vehicle distance. When the preceding vehicle moves out of the subject-vehicle traveling path, acceleration control is performed to return to the set vehicle speed.

Therefore, for example, when the preceding vehicle changes its lane in order to avoid an on-road obstacle, the subject vehicle that is following the preceding vehicle determines that the preceding vehicle moves out of the subject-vehicle traveling path, and acceleration control is started to shift to the set vehicle speed.

In this case, when the driver recognizes the on-road obstacle that has been avoided by the preceding vehicle, the driver turns the steering wheel so as to avoid the on-road obstacle. However, since the ACC system does not recognize the preceding vehicle in front of the subject vehicle, acceleration control is performed against the driver's intention. As a result, even in a situation in which the driver can normally avoid the obstacle simply by turning the steering wheel without pressing the brake pedal, since the subject vehicle is accelerated, the driver needs to press the brake pedal more than necessary. This gives the driver a feeling of discomfort.

Further, when the driver presses the brake pedal, the ACC is automatically cancelled against the driver's intention to continue the ACC.

SUMMARY OF THE INVENTION

In light of the above circumstances, it is an object of the present invention to provide a vehicle drive assist system in which, even when a preceding vehicle moves out of a subject-vehicle traveling path, normal acceleration control is not immediately started, an ACC system is not automatically cancelled against the driver's intention, and a good running state that meets the driver's intention can be obtained.

In order to achieve the above object, a vehicle drive assist system according to an aspect of the present invention includes front-environment recognition means for recognizing a running environment in front of a subject vehicle; preceding-vehicle recognition means for recognizing a preceding vehicle on the basis of the running environment recognized by the front-environment recognition means; and running control means for increasing and decreasing a subject vehicle speed so that the subject vehicle follows the preceding vehicle and for performing acceleration control so as to return the subject vehicle speed to a set vehicle speed set beforehand when the preceding vehicle moves away. The running control means includes forward-obstacle recognition means for recognizing a forward obstacle on the basis of the running environment recognized by the forward-environment recognition means after the preceding-vehicle recognition means detects that the preceding vehicle has moved away; obstacle specifying means for specifying a type of the forward obstacle recognized by the forward-obstacle recognition means by determining whether or not the forward obstacle satisfies any of obstacle specifying conditions corresponding to a plurality of preset types; and sub-running control means for limiting the acceleration control on the basis of the type specified by the obstacle specifying means.

According to the present invention, when a forward obstacle is recognized by the forward-environment recognition means after the preceding-vehicle recognition means detects that a preceding vehicle has moved away, the forward obstacle is specified as any of the preset types, and acceleration control performed by the running control means to return to the set vehicle speed is limited in accordance with the specified type. Therefore, even when the preceding vehicle moves out of the subject-vehicle traveling path, or when the forward obstacle is recognized after the preceding vehicle moves away, normal acceleration control is not started immediately. Accordingly, the driver does not need to press the brake pedal more than necessary, and ACC is not automatically cancelled against the driver's intention.

BRIEF DESCRIPTION OF THE DRAWINGS

FIGS. 6A to 6C illustrate the types of specified forward obstacles.

FIGS. 7A to 7C illustrate the types of specified forward obstacles.

DESCRIPTION OF THE PREFERRED EMBODIMENTS

Figure 1:
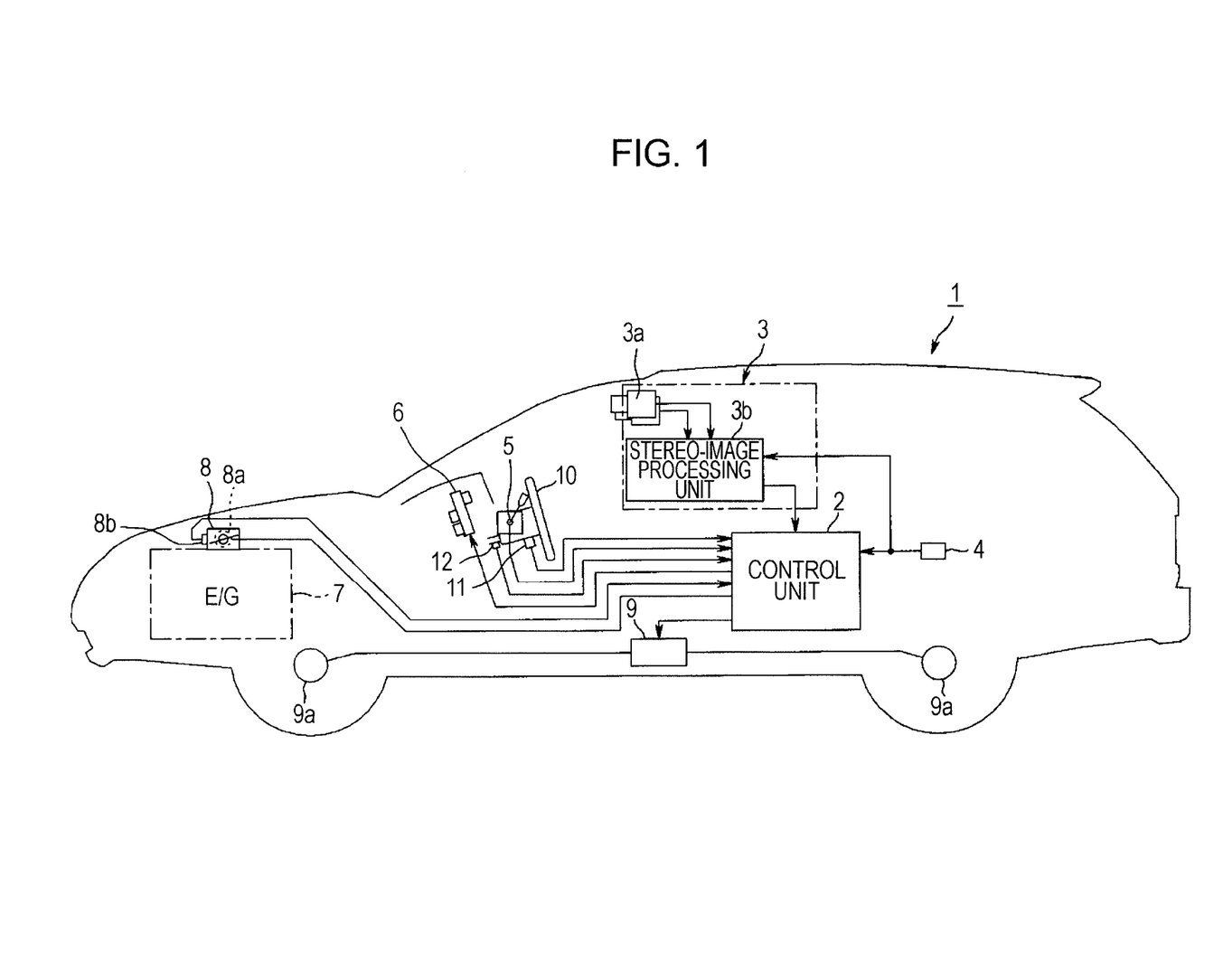
FIG. 1 is a schematic structural view of a vehicle in which a vehicle drive assist system is mounted.

An embodiment of the present invention will be described below with reference to the drawings. FIG. 1 is a schematic structural view of a vehicle in which a vehicle drive assist system is mounted.

Referring to FIG. 1, a subject vehicle, such as a car, 1 includes a control unit 2 that controls a driving state of the subject vehicle 1. The control unit 2 is mainly formed by a microcomputer including a CPU, a ROM, a RAM, and a nonvolatile memory, such as an EEPROM, which are known. The CPU processes detection signals from sensors and switches according to control programs stored in the ROM, and performs vehicle running control, such as engine control and brake control, on the basis of various data stored in the RAM and various learning data stored in the nonvolatile memory.

A front-environment recognition device 3, a vehicle-speed sensor 4, a cruise switch 5, a turn signal switch 11, a steering-angle sensor 12, a yaw-rate sensor (not shown), and a throttle-opening sensor 8b are connected to an input side of the control unit 2. The front-environment recognition device 3 serves as a front-environment recognition means that takes an image of an environment in front of the subject vehicle 1 and that recognizes a running environment in front of the subject vehicle 1 on the basis of the image. The vehicle-speed sensor 4 detects a vehicle speed V (Km/h) of the subject vehicle 1 (subject vehicle speed). The cruise switch 5 starts and stops ACC. The turn signal switch 11 is provided at a steering column. The steering-angle sensor 12 is connected to a steering shaft that is connected to a steering wheel 10, and detects a steering angle θst serving as a rotation angle of the steering wheel 10. The yaw-rate sensor detects a yaw rate γ acting on the vehicle body. The throttle-opening sensor 8b detects the opening of a throttle valve.

A combination meter 6 in which a speed meter, a rotation meter, etc. are arranged in a predetermined manner is connected to an output side of the control unit 2. Moreover, a throttle actuator 8a and a brake booster 9 are connected to the output side of the control unit 2. The throttle actuator 8a is provided in an electronic control throttle device 8 mounted in an induction system of an engine 7, and opens and closes the throttle valve. The brake booster 9 forcibly supplies hydraulic brake pressure to brake wheel cylinders 9a attached to the four wheels. When hydraulic brake pressure is supplied from the brake booster 9 to the brake wheel cylinders 9a, the wheels are braked, and the running subject vehicle 1 is forced to decelerate.

The front-environment recognition device 3 includes a stereo camera 3a and a stereo-image processing unit 3b. The stereo camera 3a includes a pair of right and left CCD cameras respectively using solid-state image pickup elements, such as charge coupled devices (CCDs), as stereo optical systems. The CCD cameras are spaced a fixed distance apart on the front of a ceiling in the vehicle interior. The CCD cameras take stereo images of a target object outside the subject vehicle 1 from different viewpoints, and input image data on the stereo images to the stereo-image processing unit 3b.

The stereo-image processing unit 3b obtains distance information from the difference between the corresponding positions in the stereo images of the environment in front of the subject vehicle 1 that are taken by the right and left CCD cameras in the stereo camera 3a, and generates a distance image on the basis of the distance information. According to data on the distance image, the stereo-image processing unit 3b recognizes the running environment in front of the subject vehicle 1, and determines whether or not an on-road obstacle is present in a traveling region in front of the subject vehicle 1. When the stereo-image processing unit 3b detects a vehicle that the subject vehicle 1 is to follow (hereinafter referred to as a "preceding vehicle"), which is traveling on a traveling path (subject-vehicle traveling path) in front of the subject vehicle 1, from on-road obstacles, it finds a relative distance Ls and a relative speed Vs between the subject vehicle 1 and the preceding vehicle. Then, the stereo-image processing unit 3b outputs information about the recognized running environment and various data on the relative distance Ls and relative speed Vs to the control unit 2.

The control unit 2 performs ACC so as to cause the subject vehicle 1 to follow the preceding vehicle. In ACC, follow-up running control for maintaining an appropriate inter-vehicle distance between the preceding vehicle and the subject vehicle 1 is performed on the basis of information about the preceding vehicle recognized by the stereo-image processing unit 3b and the subject vehicle speed V detected by the vehicle-speed sensor 4. This ACC is started by turning on the cruise switch 5.

That is, when the cruise switch 5 is turned on, the control unit 2 reads information about the preceding vehicle recognized by the stereo-image processing unit 3b, and determines whether or not a preceding vehicle to follow is traveling on the subject-vehicle traveling path. When a preceding vehicle is not detected, constant-speed running control is performed to keep the vehicle speed V of the subject vehicle 1 at the set vehicle speed set by the driver.

When a preceding vehicle serving as a vehicle to follow is detected and the vehicle speed of the preceding vehicle is less than or equal to the set vehicle speed, follow-up running control is performed so that the subject vehicle follows the preceding vehicle while keeping the inter-vehicle distance from the preceding vehicle at a target inter-vehicle distance. In this case, if the inter-vehicle distance between the subject vehicle 1 and the preceding vehicle becomes shorter than the target inter-vehicle distance as a result of deceleration of the preceding vehicle due to braking and the inter-vehicle distance cannot be returned to the target inter-vehicle distance only by engine brake, automatic brake control is performed by operating the brake booster 9 so as to supply hydraulic brake pressure to the brake wheel cylinders 9a attached to the four wheels and to forcibly brake the wheels for deceleration.

When the preceding vehicle moves out of the subject-vehicle traveling path during follow-up running control, the ACC system determines whether or not a forward obstacle is present on the subject-vehicle traveling path from which the preceding vehicle has moved out. When a forward obstacle is recognized, the type of the forward obstacle is determined. First to third estimated-collision-time determining values T1, T2, and T3 (sec) are set corresponding to the types of the forward obstacle. The estimated-collision-time determining values T1, T2, and T3 will be described below.

An estimated collision time TTC is calculated from the relative distance Ls and the relative speed Vs between the forward obstacle and the subject vehicle 1, and speed control is performed in accordance with a result of comparison between the estimated collision time TTC and the estimated-collision-time determining values T1, T2, and T3. In contrast, when a forward obstacle is not recognized on the subject-vehicle traveling path, running control is switched from follow-up running control to constant-speed running control, and transient control is performed so as to increase the subject vehicle speed V to the set vehicle speed in accordance with a preset acceleration speed.

In constant-speed running control, the set vehicle speed is set as a target vehicle speed, and the throttle valve is opened or closed by the action of the throttle actuator 8a provided in the electronic control throttle device 8 so as to keep the subject vehicle speed V at the target vehicle speed. In contrast, in follow-up running control, a target inter-vehicle distance is set on the basis of the vehicle speed of the preceding vehicle, a target vehicle speed for maintaining the target inter-vehicle distance is set, and the throttle valve is opened or closed via the throttle actuator 8a so that the vehicle speed V equals the target vehicle speed.

As described above, in the ACC system, even when the preceding vehicle moves out of the subject-vehicle traveling path, switching to constant-speed running control is not immediately made. First, it is determined whether or not a forward obstacle is present on the subject-vehicle traveling path from which the preceding vehicle has moved out. Only when a forward obstacle is not detected, switching to constant-speed running control is made. Therefore, normal acceleration control is not immediately started, and a good running state that meets the driver's intention can be obtained.

Figure 2:
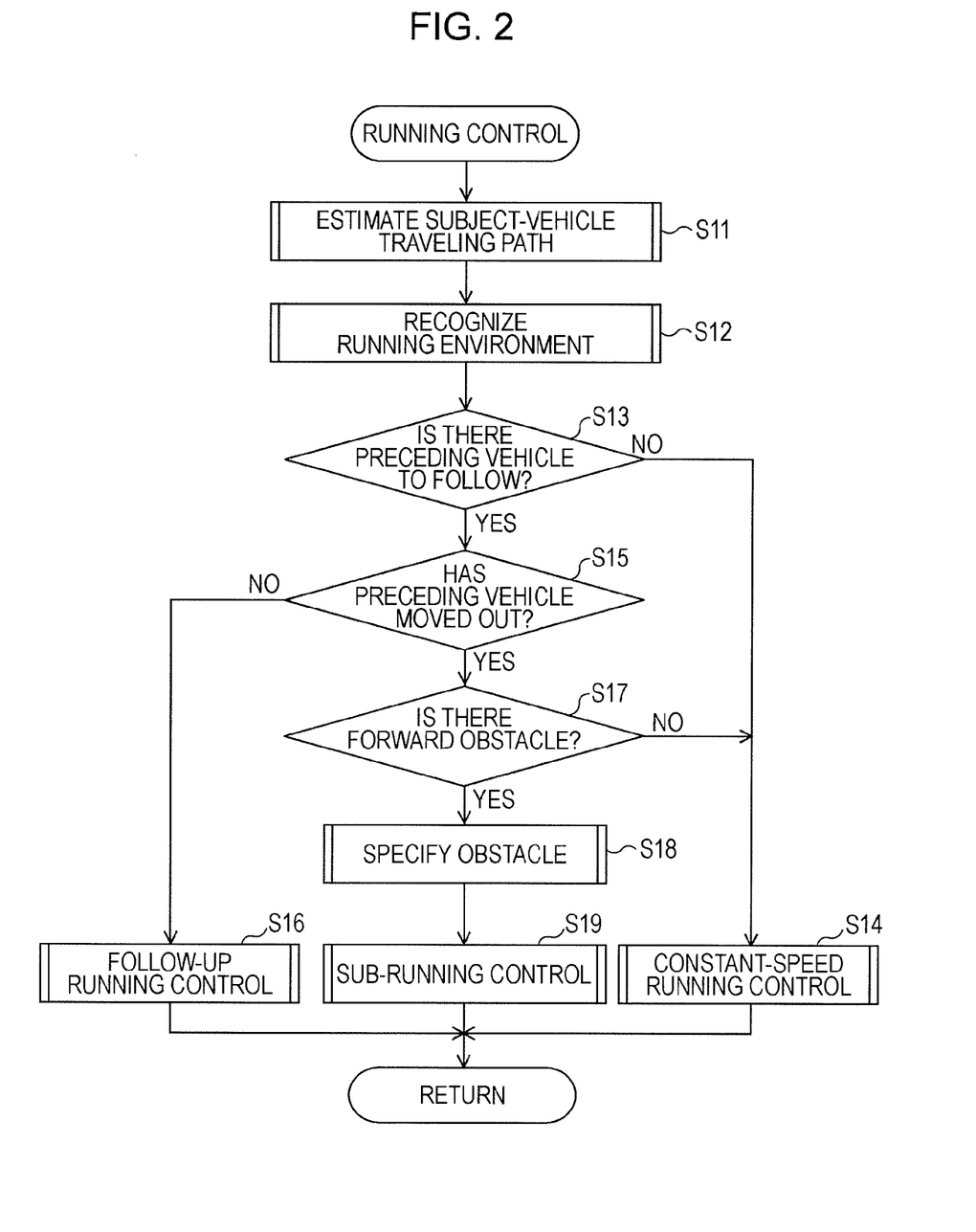
FIG. 2 is a flowchart showing a running control routine.

More specifically, the ACC system performs the above-described running control according to flowcharts shown in FIGS. 2 to 5. When the driver turns on the cruise switch 5, a running control routine shown in FIG. 2 is carried out in every setting calculation period. The operation shown in FIG. 2 corresponds to the running control means in the present invention.

First, subject-vehicle traveling-path estimation is performed in Step S11. In this subject-vehicle traveling-path estimation, a subject-vehicle traveling path is estimated on the basis of parameters indicating the behavior of the subject vehicle 1, such as the vehicle speed V detected by the vehicle-speed sensor 4, the steering angle θst of the steering wheel 10 detected by the steering-angle sensor 12, and the yaw rate γ acting on the vehicle body detected by the yaw-rate sensor (not shown), and information about the running environment recognized by the stereo-image processing unit 3b.

In Step S12, target objects, such as vehicles traveling parallel in adjacent traveling lanes and forward obstacles, are recognized on the basis of the information about the running environment recognized by the stereo-image processing unit 3b. Since this recognition method is disclosed in Japanese Unexamined Patent Application Publication No. 2003-308598 filed earlier, a description thereof is omitted. The operation in Step S12 corresponds to the forward-obstacle recognition means in the present invention.

In Step S13, on the basis of the recognized running environment, it is determined whether or not there is a preceding vehicle to follow. When a preceding vehicle is detected on the subject-vehicle traveling path estimated in the above-described Step S11 and the inter-vehicle distance from the preceding vehicle is less than or equal to the set distance, it is determined that there is a preceding vehicle to follow.

When it is determined that there is no preceding vehicle to follow, the routine jumps to Step S14. In contrast, when it is determined that there is a preceding vehicle to follow, it is determined in Step S15 whether or not the preceding vehicle has moved out. When the preceding vehicle has moved out of a traveling region centered on the subject-vehicle traveling path estimated in Step S11, it is determined that the preceding vehicle has moved out.

When it is determined that the preceding vehicle has not moved out, normal follow-up running control is performed in Step S16 so that the subject vehicle follows the preceding vehicle, and the routine is exited.

When it is determined that the preceding vehicle has moved out, it is determined in Step S17 whether or not a forward object is present on the subject-vehicle traveling path from which the preceding vehicle has moved out, on the basis of information about the running environment recognized by the stereo-image processing unit 3b. When there is no forward object, Step S14 is performed. When there is a forward object, Step S18 is performed.

When the routine proceeds from Step S13 or S17 to Step S14, constant-speed running control is performed so that the subject vehicle speed V equals the set vehicle speed, and the routine is exited.

In Step S18, a forward obstacle present on the subject-vehicle traveling path is specified. The operation in Step S18 corresponds to the obstacle specifying means in the present invention.

Figure 3:
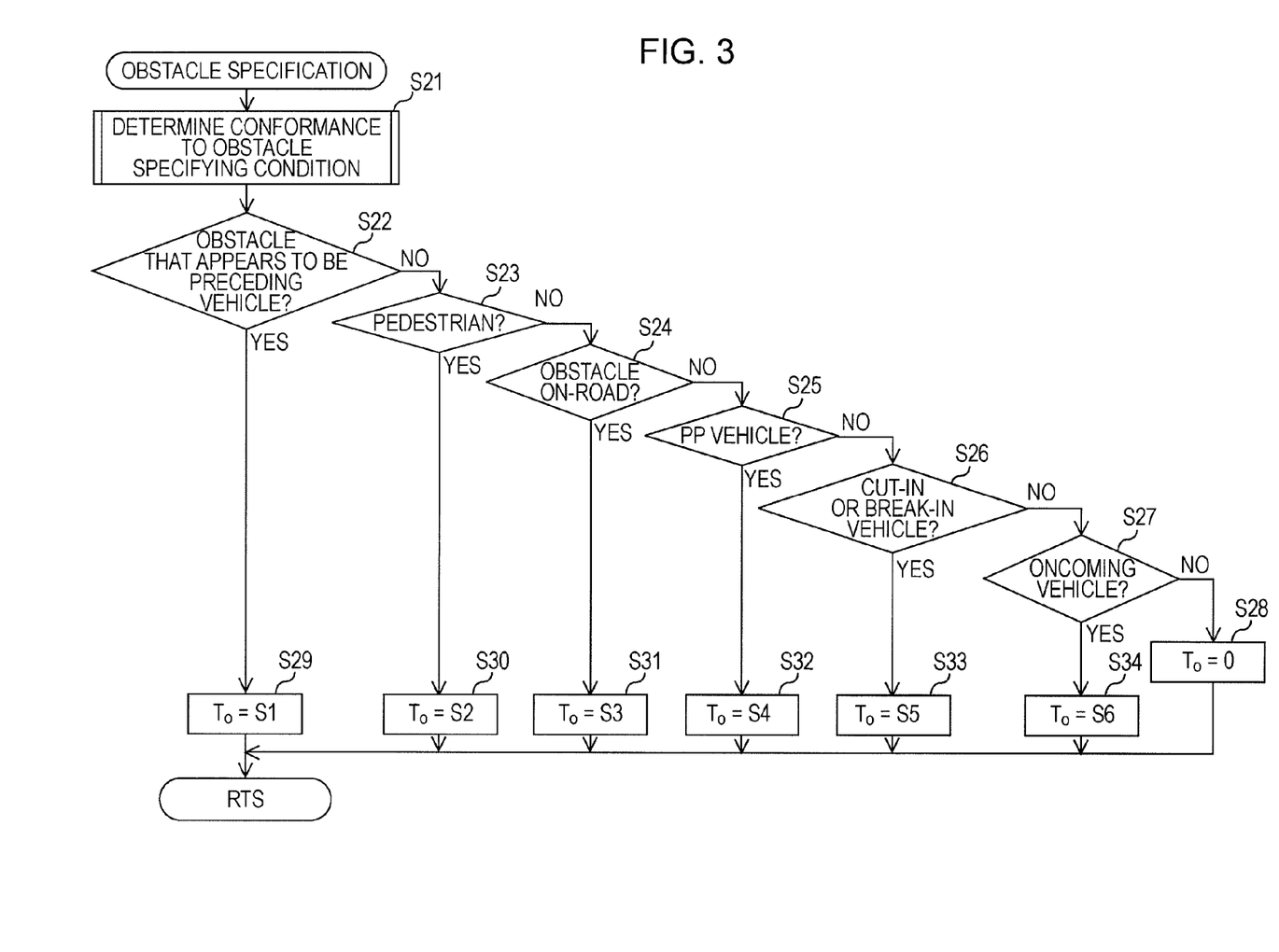
FIG. 3 is a flowchart showing an obstacle specifying subroutine.

This obstacle specification is performed according to an obstacle specifying subroutine shown in FIG. 3. In the known ACC method, after a preceding vehicle moves out, if a preceding vehicle is not recognized, the control mode is switched from follow-up running control to constant-speed running control. Therefore, acceleration control is performed to increase the subject vehicle speed V to the set vehicle speed.

However, in a case in which the stereo-image processing unit 3b does not recognize a preceding vehicle, but the driver recognizes a forward obstacle, if the subject vehicle 1 is uniformly accelerated, the running state does not meet the driver's intention. This gives the driver a feeling of discomfort. In contrast, even when the driver recognizes a forward obstacle, if the obstacle is at a remote position, it is better to shift to constant-speed running in order to realize a running state that meets the driver's intention.

Therefore, in the obstacle specifying subroutine, forward obstacles are selected on the basis of information about the running environment recognized by the stereo-image processing unit 3b after the preceding vehicle has moved out, and the most suitable ACC for each of the selected forward obstacles is performed.

That is, first, in Step S21, it is determined whether or not selected forward obstacles satisfy preset obstacle specifying conditions determined corresponding to a plurality of types. Here, six types are set in the order of descending need for quick avoidance, that is, in the order of descending priority: The types are (1) an obstacle that appears to be a preceding vehicle, (2) a pedestrian, (3) an on-road obstacle, (4) a PP-vehicle, (5) a cut-in vehicle or a break-in vehicle, and (6) an oncoming vehicle. These six types are exemplary, and the number of types may be more than or less than six as long as the types correspond to all forward obstacles which are recognized after the preceding vehicle moves out and which are not to be followed by the subject vehicle 1 with uniform acceleration.

Obstacle specifying conditions set corresponding to the types will be described in detail below:

(1) Condition for Specifying a Forward Obstacle as an Obstacle that Appears to be a Preceding Vehicle When all the following conditions (i) to (iii) are satisfied, a forward obstacle is specified as an obstacle that appears to be a preceding vehicle:

(i) The forward obstacle could not be recognized as a preceding vehicle.

(ii) The forward obstacle stays in a traveling region provided around the subject-vehicle traveling path for a predetermined time.

(iii) Any of the following conditions is satisfied:

(a) The relative distance Ls and the relative speed Vs between the forward obstacle and the subject vehicle 1 are unstable.

(b) It is possible to pass the forward obstacle by the driver's operation of turning the steering wheel.

(c) The forward obstacle is a stopped vehicle.

(d) It is difficult to determine whether or not the forward obstacle is present on the subject-vehicle traveling path.

Figure 6A:
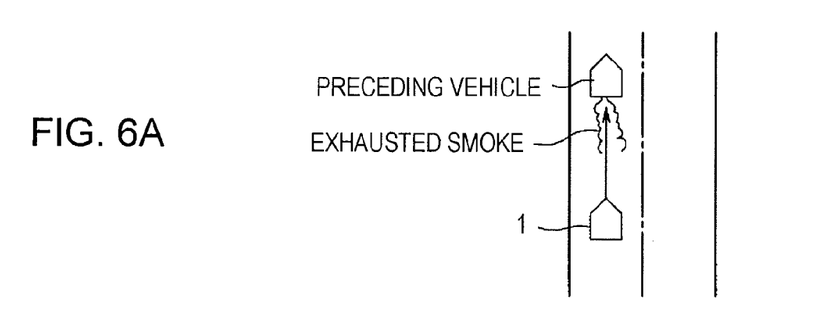
FIG. 6A illustrates a case in which an obstacle is specified as an obstacle that appears to be a preceding vehicle.

For example, a preceding vehicle that is traveling while emitting a large amount of smoke, as shown in FIG. 6A, satisfies this condition. That is, when a forward obstacle moving together with smoke is recognized although the forward obstacle cannot be specified as a preceding vehicle because of the influence of smoke, the forward obstacle is specified as an obstacle that appears to be a preceding vehicle. The term "a traveling region provided around the subject-vehicle traveling path" refers to a region centered on the subject-vehicle traveling path and having a width of several meters.

(2) Condition for Specifying a Forward Obstacle as a Pedestrian

When all the following conditions (i) to (iii) are satisfied, a forward obstacle is specified as a pedestrian:

(i) The forward obstacle could not be recognized as a preceding vehicle.

(ii) The forward obstacle stays in a traveling region provided around the subject-vehicle traveling path (a region slightly wider than the above-described traveling region used in the condition for specifying the forward obstacle as an obstacle that appears to be a preceding vehicle) for a predetermined time.

(iii) There is a low possibility that the forward obstacle is a vehicle.

Figure 6B:
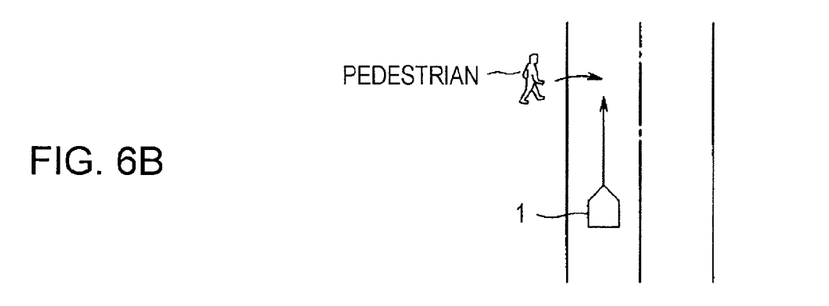
FIG. 6B illustrates a case in which an obstacle is specified as a pedestrian.

For example, a case in which a pedestrian (including small animals such as dogs and cats) is going to cross the road from the side or is walking on the road shoulder, as shown in FIG. 6B, satisfies this condition. That is, as a result of pattern matching based on the information about the running environment recognized by the stereo-image processing unit 3b, when a forward obstacle cannot be specified as a vehicle because of its small width (width in the direction crossing the subject-vehicle traveling path), but is crossing the subject-vehicle traveling path, this forward obstacle is specified as a pedestrian. Consequently, acceleration is also limited when the subject vehicle 1 passes by the pedestrian.

(3) Condition for Specifying a Forward Obstacle as an On-Road Obstacle

When all the following conditions (i) to (iii) are satisfied, a forward obstacle is specified as an on-road obstacle:

(i) The forward obstacle could not be specified as a preceding vehicle because the width thereof is small or large.

(ii) The forward obstacle stays in a traveling region provided around the subject-vehicle traveling path for a predetermined time.

(iii) Any of the following conditions (a) and (b) is satisfied:

(a) There is a low possibility that the forward obstacle is a vehicle. (b) The forward obstacle is present on the subject-vehicle traveling path.

Figure 6C:
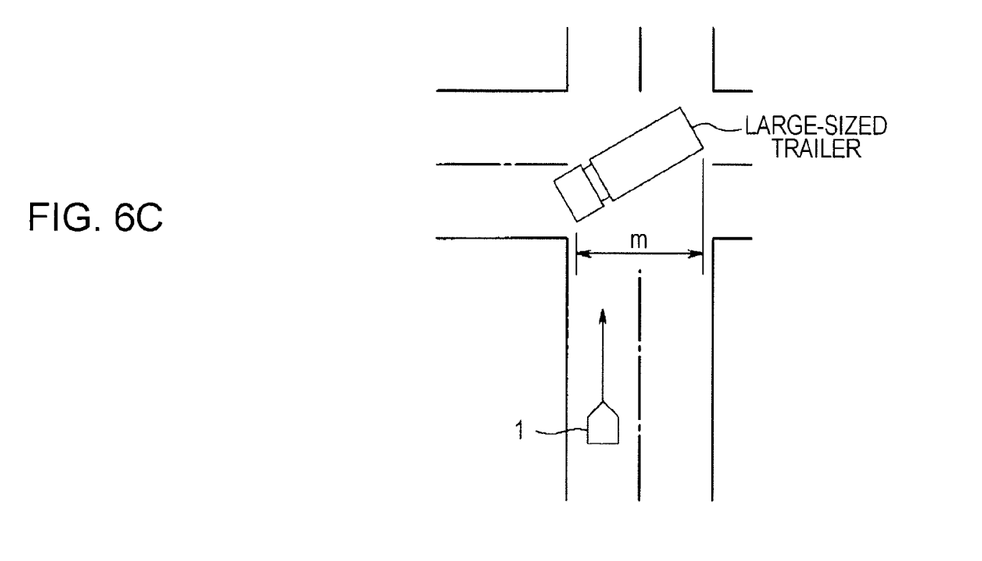
FIG. 6C illustrates a case in which an obstacle is specified as an on-road obstacle.

While it is generally determined by pattern matching whether or not the forward obstacle is a preceding vehicle, the width as a criterion of recognizing the forward obstacle as a preceding vehicle is determined to some extent (about 2 m in the case of a passenger car). Therefore, when an obstacle has a width smaller or larger than this width, it is specified as an on-road obstacle. For example, a case in which a large-sized trailer traveling in an oncoming traveling path is going to make a right turn at an intersection, as shown in FIG. 6C, satisfies this condition. That is, as a result of pattern matching based on the information about the running environment recognized by the stereo-image processing unit 3b, when a forward obstacle cannot be specified as a vehicle because its width is large, but stays in the traveling region around the subject-vehicle traveling path for a predetermined time, this forward obstacle is specified as an on-road obstacle. The on-road obstacle also includes a guardrail and a side wall extending along the curve.

(4) Condition for Specifying a Forward Obstacle as a PP-Vehicle

When all the following conditions (i) to (iii) are satisfied, a forward obstacle is specified as a PP-vehicle:

(i) The forward obstacle could not be specified as a preceding vehicle.

(ii) The forward obstacle stays in a traveling region provided around the subject-vehicle traveling path for a predetermined time.

(iii) The forward obstacle is moving farther than the preceding vehicle.

Figure 7A:
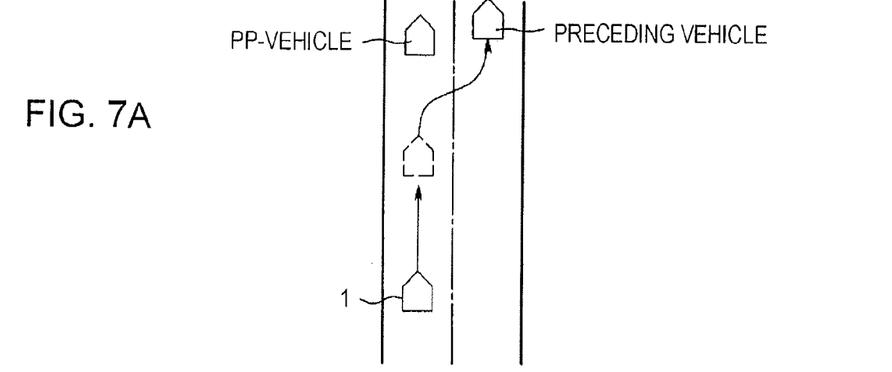
FIG. 7A illustrates a case in which an obstacle is specified as a vehicle preceding a preceding vehicle (PP-vehicle)

For example, when it is determined that the preceding vehicle has moved out of the subject-vehicle traveling path for lane change, and a moving obstacle is then detected ahead, as shown in FIG. 7A, the obstacle is specified as a PP-vehicle.

(5) Condition for Specifying a Forward Obstacle as a Cut-In Vehicle or a Break-In Vehicle When all the following conditions (i) to (iii) are satisfied, a forward obstacle is specified as a cut-in vehicle or a break-in vehicle:

(i) The forward obstacle could not be specified as a preceding vehicle.

(ii) The forward obstacle is present outside a traveling region provided around the subject-vehicle traveling path.

(iii) Judging from the moving speed, there is a high possibility that the forward obstacle will enter the traveling region after a few seconds.

Figure 7B:
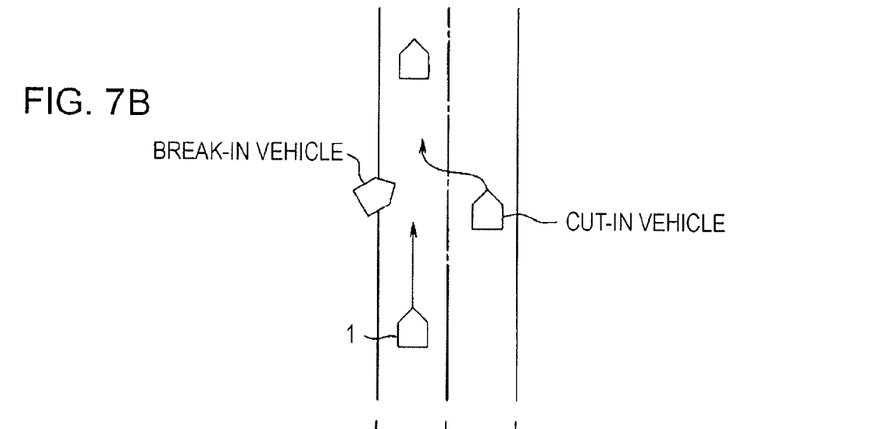
FIG. 7B illustrates a case in which an obstacle is specified as a cut-in vehicle or a break-in vehicle.

For example, when the subject vehicle 1 is traveling at a sufficient inter-vehicle distance from a vehicle in front of the subject vehicle 1, and a vehicle traveling parallel in the adjacent traveling path cuts into the subject-vehicle traveling path or a vehicle breaks into the traveling lane from the side of the road, as shown in FIG. 7B, the vehicle is specified as a cut-in vehicle or a break-in vehicle.

By promptly specifying a forward obstacle breaking in toward the subject-vehicle traveling path from the side even when the forward obstacle is not recognized as a preceding vehicle, the ACC system can quickly respond to the forward obstacle.

(6) Condition for Specifying a Forward Obstacle as an Oncoming Vehicle

When all the following conditions (i) to (iii) are satisfied, a forward obstacle is specified as an oncoming vehicle:

(i) The forward obstacle could not be specified as a preceding vehicle.

(ii) The forward obstacle stays in a traveling region provided around the subject-vehicle traveling path for a predetermined time.

(iii) A relative speed Vs between the subject vehicle 1 and the forward obstacle is higher than the subject vehicle speed V, and a relative distance Ls between the subject vehicle 1 and the forward obstacle decreases with time.

Figure 7C:
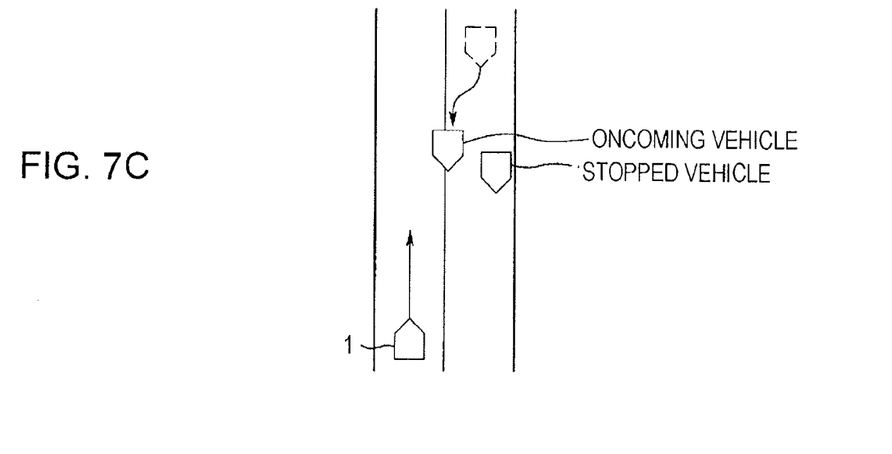
FIG. 7C illustrates a case in which an obstacle is specified as an oncoming vehicle.

For example, in a case in which a vehicle (oncoming vehicle) traveling in an oncoming traveling lane in a two-way traffic road runs into the subject-vehicle traveling lane beyond the center line because another vehicle is stopped in the oncoming traveling lane, as shown in FIG. 7C, this condition is satisfied. In this case, if acceleration control is immediately performed so as to return to the set vehicle speed, the driver has a feeling of discomfort. Alternatively, when automatic brake control is performed although the oncoming vehicle can be avoided by turning the steering wheel, the driver also has a feeling of discomfort. For this reason, when the forward obstacle is specified as an oncoming vehicle, the vehicle speed is controlled in accordance with the estimated collision time TTC of the subject vehicle 1 with respect to the oncoming vehicle.

After the forward obstacle is specified in the above-described Step S21, it is determined in Steps S22 to S27 which of an obstacle that appears to be a preceding vehicle, a pedestrian, an on-road obstacle, a PP-vehicle, a cut-in or break-in vehicle, and an oncoming vehicle the specified forward obstacle is. While the forward obstacle is sometimes specified as a combination of a plurality of types, a basic threshold value To, which will be described below, is not redundantly set because the order of priority of the specified types is determined, as will be described below.

When the forward obstacle is specified as an obstacle that appears to be a preceding vehicle in Step S22, a basic threshold value To is set at a first set value S1 in Step S29, and Step S19 in the running control routine shown in FIG. 2 is performed (To=S1). When the forward obstacle is specified as a pedestrian in Step S23, the basic threshold value To is set at a second set value S2 in Step S30, and Step S19 in the running control routine is performed (To=S2). When the forward obstacle is specified as an on-road obstacle in Step S24, the basic threshold value To is set at a third set value S3 in Step S31, and Step S19 in the running control routine is performed (To=S3).

When the forward obstacle is specified as a PP-vehicle in Step S25, the basic threshold value To is set at a fourth set value S4 in Step S32, and Step S19 in the running control routine is performed (To=S4). When the forward obstacle is specified as a cut-in or break-in vehicle in Step S26, the basic threshold value To is set at a fifth set value S5 in Step S33, and Step S19 in the running control routine is performed (To=S5). When the forward obstacle is specified as an oncoming vehicle in Step S27, the basic threshold value To is set at a sixth set value S6 in Step S34, and Step S19 in the running control routine is performed (To=S6).

When the forward obstacle is not specified as any of the types, it is regarded as another obstacle, the basic threshold value To is cleared in Step S28, and Step S19 in the running control routine is performed (To=0).

The basic threshold value To serves as a basic value used to set estimated-collision-time determining values T1, T2, T3 (sec) that will be described below. The set values S1 to S6 (sec) corresponding to the basic threshold value To are set so that the set value becomes longer as the priority thereof becomes higher.

After that, sub-running control is performed in Step S19 in the running control routine shown in FIG. 2, and the running control routine is exited. The operation in Step S19 corresponds to the sub-running control means in the present invention.

Figure 4:
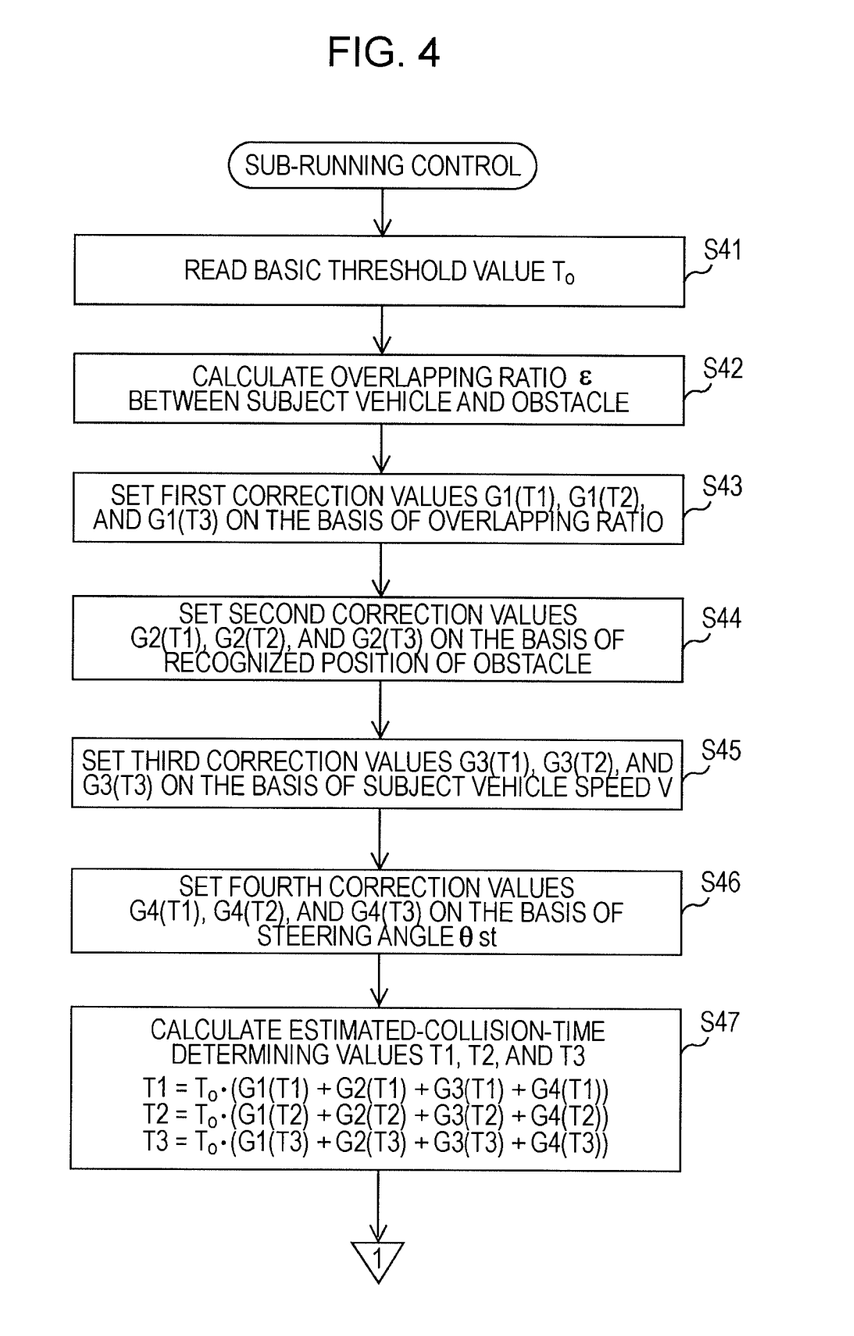
FIG. 4 is a first flowchart showing a sub-running control subroutine.

This sub-running control is carried out according to a sub-running control subroutine shown in FIG. 4. In this subroutine, the basic threshold value To is first read in Step S41, and correction values are set on the basis of the behavior of the subject vehicle 1 and the specified forward obstacle in Steps S42 to S46.

In Step S42, an overlapping ratio $\epsilon$ (%) of the width of the forward obstacle recognized by the stereo-image processing unit 3b to the width of the subject vehicle 1 is found. In Step S43, a first correction value G1(T1) for full closing of throttle, a first correction value G1(T2) for throttle keeping, and a first correction value G1(T3) for acceleration saving are set on the basis of the overlapping ratio $\epsilon$ with reference to a first correction value table with interpolation. As will be described below, first to third estimated-collision-time determining values T1, T2, and T3 are used to judge the estimated collision time TTC of the subject vehicle 1 with the specified obstacle at three levels (see FIG. 10).

Figure 9A:
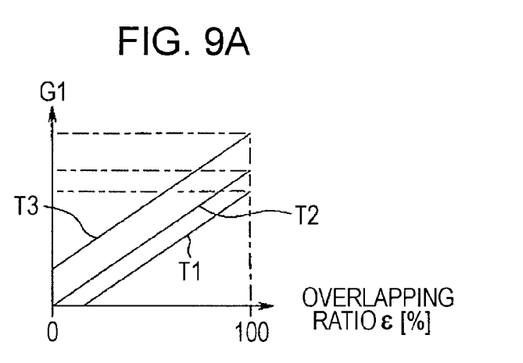
FIG. 9A explains a first correction value table, FIG. 9B explains a second correction value table, FIG. 9C explains a third correction value table, and FIG. 9D explains a fourth correction value table.

Therefore, as shown in FIG. 9A, characteristic lines T1, T2, and T3 corresponding to the first to third estimated-collision-time determining values T1, T2, and T3 are set in the first correction value table so as to ascend at a predetermined angle as the overlapping ratio $\epsilon$ increases, and Y-segments of the characteristic lines T1, T2, and T3 are set so that T1<0, T2=0, and T3>0. Therefore, since the overlapping ratio $\epsilon$ is the same, the first correction values G1(T1), G1(T2), and G1(T3) are always set so that G1(T1)<G1(T2)<G1(T3).

Figure 9B:
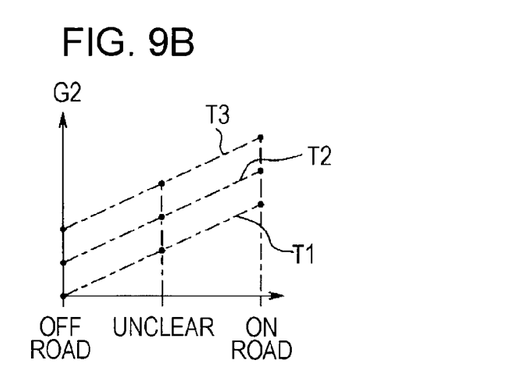

In Step S44, a second correction value G2(T1) for full closing of throttle, a second correction value G2(T2) for throttle keeping, and a third correction value G2(T3) for acceleration saving are set on the basis of the position of the forward obstacle recognized by the stereo-image processing unit 3b with reference to a second correction value table. As shown in FIG. 9B, the positions of the forward obstacle are divided into three types, namely, an off-road position, an unclear position, and an on-road position, and the Y-segment corresponds to the off-road position, the maximum value corresponds to the on-road position, and the intermediate value corresponds to the unclear position. Second correction values G2(T1), G2(T2), and G2(T3) are set in the second correction value table on the basis of the characteristic lines T1, T2, and T3 corresponding to the first to third estimated-collision-time determining values T1, T2, and T3. The characteristic lines T1, T2, and T3 are set so as to ascend at a predetermined angle as the position of the forward obstacle shifts from the off-road position toward the on-road position, and Y-segments of the characteristic lines T1, T2, and T3 are set so that T1=0 and T1<T2.

Figure 9C:
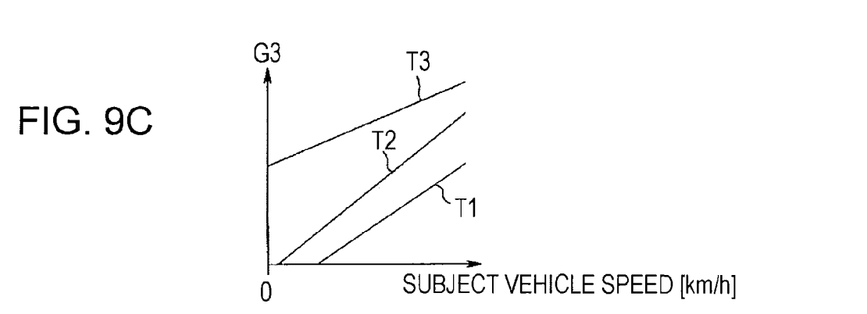

In Step S45, a third correction value G3(T1) for full closing of throttle, a third correction value G3(T2) for throttle keeping, and a third correction value G3(T3) for acceleration saving are set on the basis of the subject vehicle speed V with reference to a third correction value table with interpolation. As shown in FIG. 9C, characteristic lines T1, T2, and T3 corresponding to the first to third estimated-collision-time determining values T1, T2, and T3 are set in the third correction value table on the basis of the subject vehicle speed V so as to ascend at a predetermined angle as the subject vehicle speed V increases.

Figure 9D:
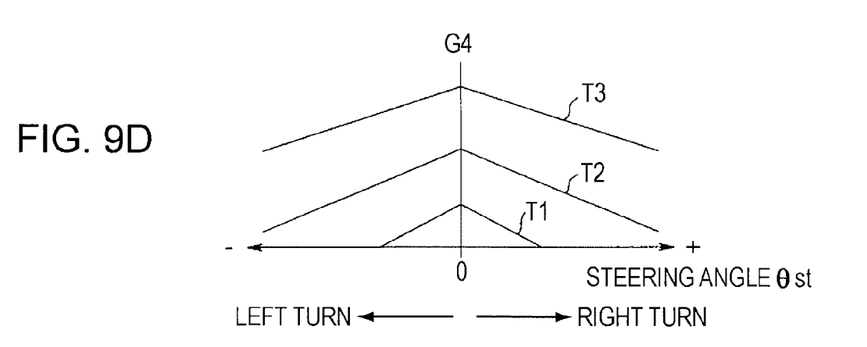

In Step S46, a fourth correction value G4(T1) for full closing of throttle, a fourth correction value G4(T2) for throttle keeping, and a fourth correction value G4(T3) for acceleration saving are set on the basis of the steering angle θst with reference to a fourth correction value table with interpolation. In FIG. 9D, a direction in which the steering angle θst changes from a neutral position (θst=0) for a right turn is designated as a positive direction, and a direction in which the steering angle θst changes for a left turn is designated as a negative direction. As shown in FIG. 9D, characteristic lines T1, T2, and T3 corresponding to the first to third estimated-collision-time determining values T1, T2, and T3 are set in the third correction value table so as to gradually descend as the steering angle θst increases or decreases from the neutral position. Y-segments of the characteristic lines T1, T2, and T3 are set so that T1<T2<T3.

The above-described correction values G1(n), G2(n), G3(n), and G4(n) (n=T1, T2, T3) are set within the range of 0 to 1.0.

In Step S47, first to third estimated-collision-time determining values T1, T2, and T3 are respectively calculated by the following expressions:

$$T1 = To \cdot (G1(T1) + G2(T1) + G3(T1) + G4(T1))$$

$$T2 = To \cdot (G1(T2) + G2(T2) + G3(T2) + G4(T2))$$

$$T3 = To \cdot (G1(T3) + G2(T3) + G3(T3) + G4(T3))$$

Figure 8:
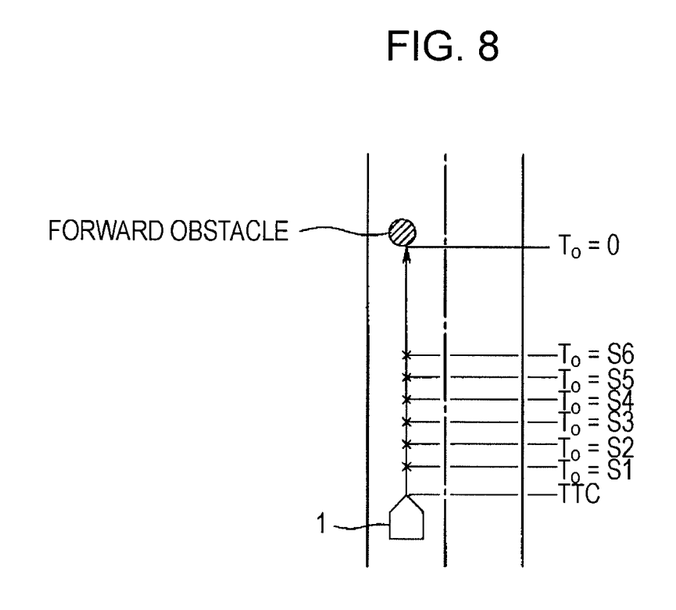
FIG. 8 illustrates basic threshold values set corresponding to the types of forward obstacles.

As described above, the characteristic lines T1, T2, and T3 of the correction values G1(n), G2(n), G3(n), and G4(n) (n=T1, T2, T3) are set so that T1<T2<T3. Therefore, estimated-collision-time determining values T1, T2, and T3 are also calculated so that T1<T2<T3. For example, when a forward obstacle is specified as an obstacle that appears to be a preceding vehicle and the subject vehicle 1 is traveling in a straight path, T1, T2, and T3 are approximately set at 6 sec, 8 sec, and 12 sec, respectively. Further, since the basic threshold value To is set at different values corresponding to the specified forward obstacles, as shown in FIG. 8, each of the estimated-collision-time determining values T1, T2, and T3 is also set at different values corresponding to the specified forward obstacles.

In Step S48, an estimated collision time TTC is calculated from the relative distance Ls and the relative speed Vs between the subject vehicle 1 and the forward obstacle according to the following expression:

$$TTC = Ls/Vs$$

Figure 5:
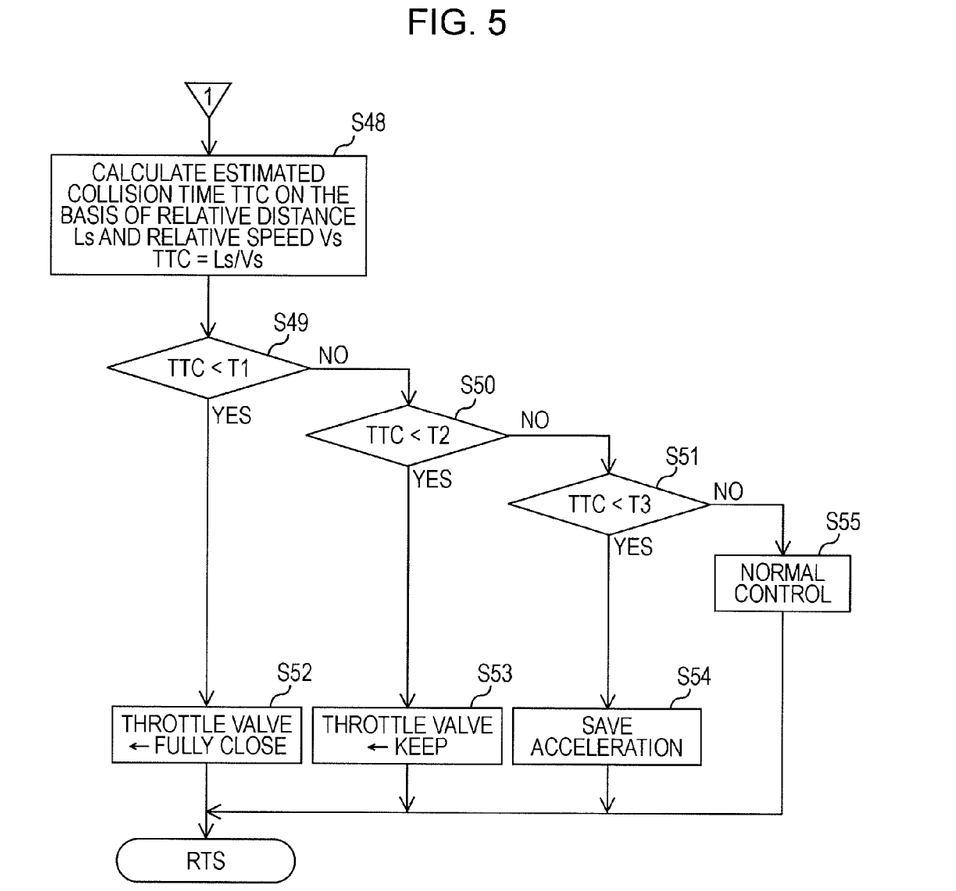
FIG. 5 is a second flowchart showing the sub-running control subroutine.

Subsequently, the estimated collision time TTC is compared with the estimated-collision-time determining values T1, T2, and T3 in Steps S49 to S51.

In Step S49, when TTC<T1, it is determined that the subject vehicle 1 comes close to the specified forward obstacle, a throttle full closing signal is output to the throttle actuator 8a of the electronic control throttle device 8 in Step S52, and the routine is exited. As a result, the throttle valve is fully closed, engine brake is started, and the subject vehicle 1 is decelerated automatically. Consequently, the speed for approaching the forward obstacle is decreased, and the driver can effectively avoid the forward obstacle by turning the steering wheel.

When it is determined in Step S50 that T1≤TTC<T2, a signal for maintaining the throttle valve opening is output to the throttle actuator 8a of the electronic control throttle device 8 in Step S53, and the routine is exited. As a result, the throttle valve opening is fixed, and the subject vehicle 1 travels at the substantially constant speed. When the estimated collision time TTC is longer than the first estimated-collision-time determining value T1 and shorter than the second estimated-collision-time determining value T2, it has some margin. Therefore, the driver can ensure a sufficient time to avoid the forward obstacle by the operation of the steering wheel without increasing the subject vehicle speed V.

When it is determined in Step S51 that T2≤TTC<T3, an acceleration signal that limits the increase rate of the throttle valve opening is output to the throttle actuator 8a of the electronic control throttle device 8 in Step S54, and the routine is exited. As a result, the acceleration speed becomes lower than the normal acceleration speed. When the estimated collision time TTC is longer than the second estimated-collision-time determining value T2 and shorter than the third estimated-collision-time determining value T3, it has a sufficient margin. Therefore, even when the subject vehicle speed V is slowly increased, the driver can sufficiently avoid the forward obstacle by turning the steering wheel.

When it is determined in Step S51 that T3≤TTC, there is a sufficient distance from the forward obstacle. Therefore, acceleration control is performed in Step S55 so as to shift to normal control, that is, constant-speed running control, and the routine is exited.

Figure 10:
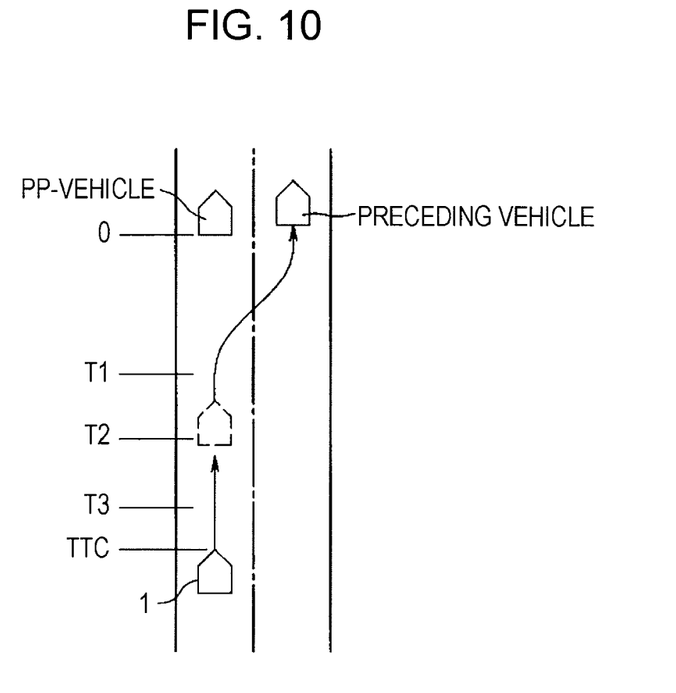
FIG. 10 explains ACC performed when a forward obstacle is specified as a PP-vehicle.

For example, when a forward obstacle recognized after the preceding vehicle moves away is specified as a PP-vehicle, as shown in FIG. 10, the estimated collision time TTC (sec) of the subject vehicle 1 with respect to the PP-vehicle is compared with the set first to third estimated-collision-time determining values T1, T2, and T3. When the PP-vehicle is traveling farther than the position corresponding to the third estimated-collision-time determining value T3 (e.g., 12 sec), running control is switched from follow-up running control to constant-speed running control under ACC, and normal acceleration control is performed so as to shift the subject vehicle speed V to the set vehicle speed. When the basic threshold value To is cleared in the above-described step S28, since T1=T2=T3=0, normal control is carried out.

When the estimated collision time TTC of the subject vehicle 1 becomes shorter than the third estimated-collision-time determining value T3, acceleration is limited (slow acceleration), and the inter-vehicle distance from the PP-vehicle is gradually decreased. After that, when the estimated collision time TTC becomes shorter than the second estimated-collision-time determining value T2 (e.g., 8 sec), the throttle valve is fixed, the subject vehicle 1 travels at a substantially constant speed, and the inter-vehicle distance between the subject vehicle 1 and the PP-vehicle is decreased more slowly. Then, when the estimated collision time TTC of the subject vehicle 1 becomes shorter than the first estimated-collision-time determining value T1 (e.g., 6 sec), the throttle valve is fully closed, engine brake is started, and the subject vehicle 1 decelerates.

As described above, in this embodiment, when a forward obstacle is recognized after the preceding vehicle moves away, acceleration control for shifting to the set vehicle speed is not immediately started. Therefore, it is unnecessary for the driver to press the brake pedal, and ACC is not automatically cancelled, but is continued. As a result, it is possible to obtain a good running state that meets the driver's intention.

When the forward obstacle recognized after the preceding vehicle moves away is specified as any of the six types according to the preset obstacle specifying conditions, a basic threshold value To is set corresponding to the type so as to become larger in the order of decreasing priority. Therefore, the first to third estimated-collision-time determining values T1, T2, and T3 set on the basis of the basic threshold value To are also set to become larger in the order of decreasing priority of the specified forward obstacle, and the above-described control of the opening of the throttle valve is performed earlier. As a result, after the preceding vehicle moves away, normal acceleration control on the subject vehicle 1 is not immediately started, and ACC is performed according to the driver's intention. Further, since the speed of the subject vehicle 1 is controlled stepwise by comparing the estimated collision time TTC with the three estimated-collision-time determining values T1, T2, and T3, ACC that more reliably meets the driver's intention can be carried out.

What is claimed is:

1. A vehicle drive assist system comprising:
   front-environment recognition means for recognizing a running environment in front of a subject vehicle;
   preceding-vehicle recognition means for recognizing a preceding vehicle on the basis of the running environment recognized by the front-environment recognition means; and
   running control means for increasing and decreasing the subject vehicle speed so that the subject vehicle follows a recognized preceding vehicle and for performing acceleration control so as to return the subject vehicle speed to a previously set vehicle speed when the preceding vehicle moves away,
   wherein the running control means includes:
   forward-obstacle recognition means for recognizing a forward obstacle on the basis of the running environment recognized by the front-environment recognition means after the preceding-vehicle recognition means detects that the preceding vehicle has moved away;
   obstacle specifying means for specifying a type of the forward obstacle recognized by the forward-obstacle recognition means by determining whether or not the forward obstacle satisfies any of obstacle specifying conditions corresponding to a plurality of preset types; and
   sub-running control means for limiting the acceleration control performed by the running control means upon the forward-obstacle recognition means recognizing a forward obstacle after the preceding-vehicle recognition means detects that the preceding vehicle has moved away, wherein
   the sub-running control means limits the acceleration control performed by the running control means based on the forward obstacle type specified by the obstacle specifying means such that an acceleration control performed by the running control means with limitation by the sub-running control means results in a lower value of acceleration as compared to a value of acceleration that would result from the acceleration control performed by the running control means without limitation by the sub-running control means.

2. The vehicle drive assist system according to claim 1, wherein a priority order is determined for the types of the forward obstacles to be specified by the obstacle specifying means, and the sub-running control means limits the acceleration control based on the determined priority order in the order of descending priority types.

3. The vehicle drive assist system according to claim 2, wherein a type of forward obstacle to be specified by the obstacle specifying means is at least one of: a preceding vehicle; a pedestrian; an on-road obstacle; a vehicle preceding a preceding vehicle; a breaking-in vehicle; and an oncoming vehicle.

4. The vehicle drive assist system according to claim 3, wherein the sub-running control means limits the acceleration control based on an estimated time to collision of the subject vehicle and a forward obstacle, wherein the estimated time to collision is calculated based on a basic threshold value, and wherein the basic threshold value is assigned based on the type of the forward obstacle as specified by the obstacle specifying means.

5. The vehicle drive assist system according to claim 4, wherein each of the types of forward obstacles to be specified by the obstacle specifying means are assigned a different basic threshold value.

6. The vehicle drive assist system according to claim 1, wherein the sub-running control means compares an estimated collision time and an estimated-collision-time determining value set for each of the types of the forward obstacle, and limits the acceleration control when the estimated collision time is shorter than the estimated-collision-time determining value.

7. The vehicle drive assist system according to claim 6, wherein the estimated-collision-time determining value is set on the basis of a basic threshold value set for each of the types of the forward obstacle.

8. The vehicle drive assist system according to claim 7, wherein the basic threshold value is set to increase as a priority of the type of the forward obstacle increases.

9. The vehicle drive assist system according to claim 6, wherein the estimated-collision-time determining value is set by correcting a basic threshold value set for each of the types of the forward obstacle by a correction value set on the basis of behavior of the subject vehicle and the specified forward obstacle.

10. The vehicle drive assist system according to claim 9, wherein the estimated-collision-time determining value includes three determination levels, and the correction value is set for each of the determination levels.

11. The vehicle drive assist system according to claim 10, wherein the basic threshold value is set to increase as a priority of the type of the forward obstacle increases.

12. The vehicle drive assist system according to claim 9, wherein the basic threshold value is set to increase as a priority of the type of the forward obstacle increases.

13. The vehicle drive assist system according to claim 5, wherein the assigned basic threshold values of the preset forward obstacle types increase, as the priority of the preset forward obstacle types increase.

14. A vehicle drive assist system comprising:
   a front-environment recognizer configured to recognize a running environment in front of a subject vehicle;
   a preceding-vehicle recognizer configured to recognize a preceding vehicle on the basis of the running environment recognized by the front-environment recognizer; and
   a running controller configured to increase and decrease the subject vehicle speed so that the subject vehicle follows a recognized preceding vehicle, and to perform an acceleration control so as to return the subject vehicle speed to a previously set vehicle speed when the preceding vehicle moves away,
   wherein the running controller includes:
   a forward-obstacle recognizer configured to recognize a forward obstacle, and to determine if the forward obstacle is in, or predicted to enter into, a travelling region of the subject vehicle, each on the basis of the running environment recognized by the front-environment recognizer after the preceding-vehicle recognizer detects that the preceding vehicle has moved away;
   an obstacle specifier configured to specify a type of a recognized forward obstacle that is determined, by the forward-obstacle recognizer, to be in, or predicted to enter into, a travelling region of the subject vehicle by determining whether or not the forward obstacle satisfies any of obstacle specifying conditions corresponding to a plurality of preset types; and a sub-running controller configured, upon the forward-obstacle recognizer recognizing a forward obstacle after the preceding-vehicle recognizer detects that the preceding vehicle has moved away, to limit the acceleration control performed by the running controller based on the forward obstacle type specified by the obstacle specifier, wherein the vehicle drive assist system is configured such that an acceleration control performed by the running controller with limitation by the sub-running controller results in a lower value of acceleration as compared to a value of acceleration that would result from the acceleration control performed by the running controller without limitation by the sub-running controller.

15. The vehicle drive assist system according to claim 14, wherein the obstacle specifier is configured to specify forward obstacles according to a predetermined priority order, and the sub-running controller is further configured to limit the acceleration control based on the predetermined priority order.

16. The vehicle drive assist system according to claim 15, wherein the obstacle specifier is configured to specify a forward obstacle as at least one of the following types: a preceding vehicle; a pedestrian; an on-road obstacle; a vehicle preceding a preceding vehicle; a breaking-in vehicle; and an oncoming vehicle.

17. The vehicle drive assist system according to claim 16, wherein the sub-running controller is configured to limit the acceleration control based on an estimated time to collision of the subject vehicle and a forward obstacle, wherein the estimated time to collision is calculated based on a basic threshold value, and wherein the basic threshold value is assigned based on the type of the forward obstacle as specified by the obstacle specifier.

18. The vehicle drive assist system according to claim 17, wherein the obstacle specifier is configured to assign a different basic threshold value to each of the types of forward obstacles.

19. The vehicle drive assist system according to claim 18, wherein the assigned basic threshold values of the forward obstacle types increase, as the priority of the forward obstacle types increase.

20. A vehicle drive assist system comprising:

a front-environment recognizer configured to recognize a running environment in front of a subject vehicle;

a preceding-vehicle recognizer configured to recognize a preceding vehicle on the basis of the running environment recognized by the front-environment recognizer; and a running controller configured, upon the recognition of a preceding vehicle by the preceding-vehicle recognizer, to increase and decrease the subject vehicle speed so that the subject vehicle follows the recognized preceding vehicle, and, upon the preceding-vehicle recognizer detecting that the recognized preceding vehicle has moved away, to perform an acceleration control so as to return the subject vehicle speed to a previously set vehicle speed, wherein the running controller includes:

a forward-obstacle recognizer configured to recognize a forward obstacle, and to determine if the forward obstacle is in, or predicted to enter into, a travelling region of the subject vehicle, based on the running environment recognized by the front-environment recognizer after the preceding-vehicle recognizer detects that the preceding vehicle has moved away;

an obstacle specifier configured to specify a type of a forward obstacle recognized by the forward-obstacle recognizer as an object in, or predicted to enter into, a travelling region of the subject vehicle by determining whether or not the forward obstacle satisfies at least one of a plurality of obstacle specifying conditions corresponding to a plurality of preset obstacle types; and a sub-running controller configured, upon the forward-obstacle recognizer recognizing a forward obstacle after the preceding-vehicle recognizer detects that the preceding vehicle has moved away, to alter the running controller's performance of the acceleration control based on the type of the forward obstacle specified by the obstacle specifier, wherein the sub-running controller is configured to effect two different alterations to the acceleration control between two different preset obstacle types.

* * * * *